United States Patent [19]

Sheen et al.

[11] Patent Number: 5,403,998
[45] Date of Patent: Apr. 4, 1995

[54] MICROWAVABLE SUSCEPTOR AND METHOD OF USING SAME

[75] Inventors: Shiowshuh Sheen, New Hyde Park; John H. Moyer, Garden City; Simon Gagel, Forest Hills, all of N.Y.

[73] Assignee: DCA Food Industries, Inc., Garden City, N.Y.

[21] Appl. No.: 29,000

[22] Filed: Mar. 10, 1993

[51] Int. Cl.$^6$ .............................................. H05B 6/80
[52] U.S. Cl. .................... 219/730; 219/759; 426/107; 99/DIG. 14
[58] Field of Search ................ 219/10.55 E, 10.55 F, 219/10.55 M, 730, 759; 426/107, 234, 243; 99/DIG. 14

[56] References Cited

U.S. PATENT DOCUMENTS

| | | |
|---|---|---|
| 4,283,427 | 8/1981 | Winters et al. |
| 4,316,070 | 2/1982 | Prosise et al. |
| 4,460,713 | 7/1984 | Lee et al. ............................ 521/122 |
| 4,776,936 | 10/1988 | Smith et al. ........................... 264/25 |
| 4,882,184 | 11/1989 | Buckholz et al. |
| 4,904,490 | 2/1990 | Buckholz et al. |
| 4,937,412 | 6/1990 | Dobry |
| 4,943,697 | 7/1990 | Buckholz et al. |
| 4,968,865 | 11/1990 | Seaborne et al. |
| 4,970,358 | 11/1990 | Brandberg et al. |
| 4,985,261 | 1/1991 | Kang et al. |
| 4,985,606 | 1/1991 | Faller ........................................ 219/730 |
| 5,106,520 | 4/1992 | Salyer ......................................... 252/70 |
| 5,124,161 | 6/1992 | van Lengerich et al. ............. 426/94 |
| 5,220,141 | 6/1993 | Quick et al. .................... 219/10.55 E |

*Primary Examiner*—Philip H. Leung
*Attorney, Agent, or Firm*—Amster, Rothstein & Ebenstein

[57] ABSTRACT

A susceptor for use in the microwave cooking of food, includes a first plastic film, a second plastic film, and a semi-liquid lossy material disposed intermediate the first and second films. The lossy material includes glycerine, sucrose ester, and chloride salt, 25 grams of the lossy material in a 50 ml. glass beaker being heatable to at least 200° C. within 40 seconds by 900 watts of microwave energy in a 1.1 cu. ft. oven. Preferably a layer of paper is sandwiched between the first and second films, the lossy material being absorbed on the paper layer. The susceptor is preferably biodegradable and edible. A method of microwave cooking includes the steps of providing an assembly of such a susceptor and the food to be microwave cooked, cooking the food in intimate contact with the susceptor in a microwave oven, and separating the microwave cooked food from the susceptor.

40 Claims, 1 Drawing Sheet

MICROWAVABLE SUSCEPTOR AND METHOD OF USING SAME

BACKGROUND OF THE INVENTION

The present invention relates to a susceptor for use in the microwave cooking of food, and more particularly to such a susceptor which is both edible and biodegradable, as well as a method of using the same.

The susceptors for microwave cooking available in the commercial markets include metallized film or paper sheet laminations containing glue. These commercially available susceptors are not fully acceptable since they are not entirely safe as there is a possibility that the metal or glue utilized therein could release toxic compounds during or after microwave heating, thereby contaminating the food being cooked. Further, the commercially available susceptors are not attractive from an ecological point of view since they are not biodegradable. Accordingly, the need remains for a safe susceptor, preferably biodegradable and edible.

The susceptor of the present invention is intended to be used in a conventional manner—that is, intimately contacted with the food to be cooked in order to form an assembly, the assembly heated in a microwave oven to cook the food, and then the assembly dismantled, with the susceptor being separated from the cooked food. Nonetheless, the edible nature of such a susceptor remains important for a variety of reasons. First, the edible nature ensures that there will not be any metal or glue to release toxic compounds during or after microwave heating. Second, the user of the susceptor is assured that, even if a portion of the susceptor adheres to the food being cooked or the susceptor bursts or breaks during the course of cooking, the food does not become contaminated and inedible. For these purposes, the term "edible" as used herein and in the claims encompasses, in addition to materials which are conventionally thought of as edible, small amounts of paper and plastic, which, although not particularly palatable, may be ingested without adverse effects.

Various susceptors have been proposed for use in microwave cooking in order to increase the sensible heat level immediately adjacent the food being cooked. The proposed susceptors include polypropylene-coated wax paper or polyhydroxyl alcohol-containing substrates. Glycerine and propylene glycol are examples of the polyhydroxyl alcohols which are high lossy materials that can be employed to convert a portion of the microwave energy impacting thereon into sensible heat. See, for example, U.S. Pat. Nos. 4,882,184 and 4,968,865. The highest temperature achievable with a propylene glycol susceptor is 185° C., and the highest temperature achievable with a glycerine susceptor is 290° C. These temperatures are, however, the temperatures achievable in the alcohols, not the temperature which is experienced by the food being cooked. Due to the heat-transfer resistance of whatever material contains the alcohol and the air gap between the alcohol-containing film and the food being cooked, the temperature at the contact surface of the food is substantially less than the temperature of the alcohol itself and, typically less than 135° C. Thus the known alcohol-based susceptors simply lack sufficient effectiveness for many applications where a higher temperature is desired, and especially where a high temperature is desired in a very limited time (time being of the essence since quick cooking is a main attraction of the microwave cooking system). The heating rates of glycerine and polypropylene glycol are not high enough to be compatible with the commercially available metallized film or paper laminated susceptors.

In order to provide a benchmark for satisfactory performance of a lossy material, it was determined that 25 grams of a lossy material in a 50 milliliter glass beaker should be heatable to at least 200° C. within 40 seconds by 900 watts of microwave energy in 1.1 cubic foot oven. The 900 watt 1.1 cubic foot oven represents the capacity of a common household microwave oven, 40 seconds represents a satisfactorily short microwave cook time (depending on the size of the foodstuff), and 200° C. provides sufficient sensible heat for general susceptor purposes, including browning. In other words, the lossy material should enable the food to achieve a surface temperature of at least 135° C. in microwave heating. For comparative purposes, glycerine by itself as a lossy material, under the test conditions noted above, is heatable to only 160° C. within 40 seconds.

Accordingly, it is an object of the present invention to provide a susceptor for use in the microwave cooking of food which contains a lossy material heatable to at least 200° C. in a common household microwave oven.

Another object is to provide such a susceptor which in a preferred embodiment is biodegradable.

A further object is to provide such a susceptor which in a preferred embodiment is edible.

It is also an object of the present invention to provide such a susceptor which is economical to manufacture and simple and safe to use.

It is another object to provide a method of microwave cooking using such a susceptor.

SUMMARY OF THE INVENTION

It has now been found that the above and related objects of the present invention are obtained in a susceptor for use in the microwave cooking of food, comprising a first plastic film, a second plastic film, and, disposed intermediate the first and second films, a semi-liquid lossy material including glycerine, sucrose ester, and chloride salt. Grams of the lossy material in a 50 ml. glass beaker is heatable to at least 200° C. within 40 seconds by 900 watts of microwave energy in 1.1 cu. ft. oven. Preferably the susceptor additionally includes a layer of paper sandwiched between the first and second films, the lossy material being absorbed on the paper layer.

In a preferred embodiment, the chloride salt is selected from the group consisting of sodium chloride, potassium chloride, and combinations thereof, and the sucrose ester is selected from the group consisting of behenate, stearate, oleate, palmitate, myristate, and laurate esters and combinations thereof. The lossy material includes a 2–10% sucrose ester and less than 4% chloride salt, based on the weight of the lossy material.

The lossy material may also include a lossiness enhancer selected from the group consisting of less than 4% sodium carboxymethylcellulose, less than 8% acidic polysaccharide gum, and less than 6% propylene glycol, based on the weight of the lossy material. The acidic polysaccharide gum is selected from the group consisting of Karaya gum, Ghatti gum, Tragacanth gum, and combinations thereof.

The lossy material may additionally include a viscosity modifier selected from the group consisting of gelatin, pectin, sodium carboxymethylcellulose, and combinations thereof, thereby to provide a desirable viscosity for application of the lossy material.

In a preferred embodiment, the susceptor is both edible and biodegradable.

The present invention further encompasses a method of microwave cooking comprising the steps of providing an assembly of the susceptor and the food to be microwave cooked, cooking the food in intimate contact with the susceptor in a microwave oven, and separating the microwave cooked food from the susceptor.

BRIEF DESCRIPTION OF THE DRAWING

The above brief description, as well as further objects, features and advantages of the present invention, will be more fully understood by reference to the following detailed description of the presently preferred, albeit illustrative, embodiments of the present invention when taken in conjunction with the accompanying drawing wherein.

DETAILED DESCRIPTION OF THE PREFERRED EMBODIMENTS

Figure 1:
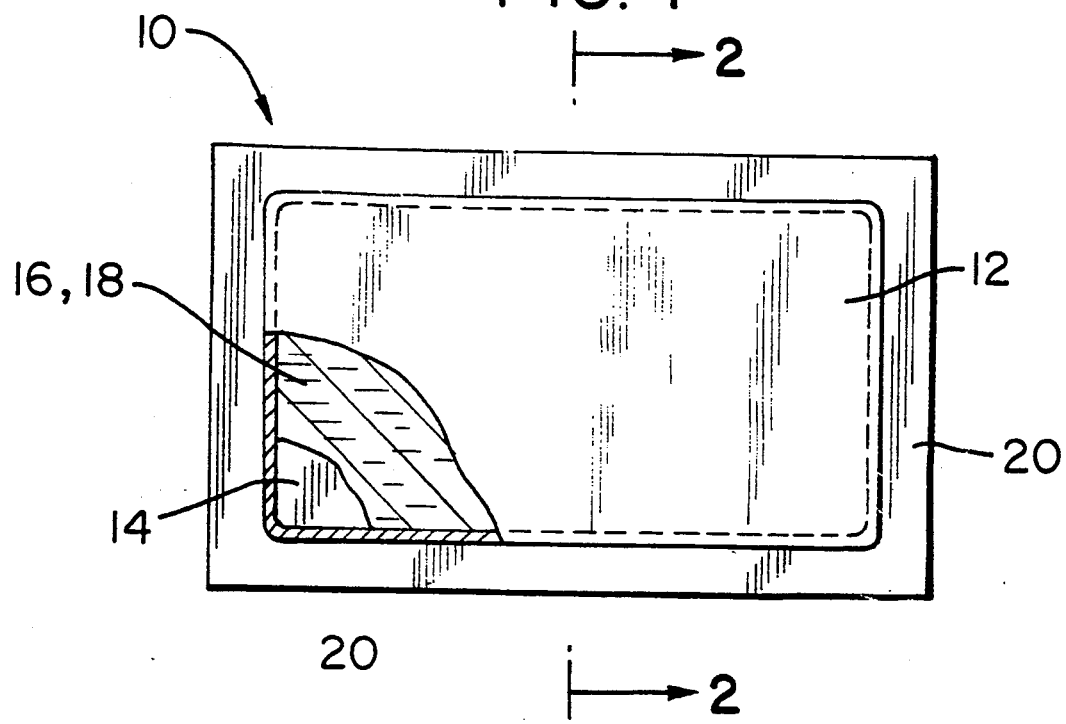
FIG. 1 is a top plan view of a susceptor according to the present invention, with portions thereof cut away to reveal internal details.
Figure 2:
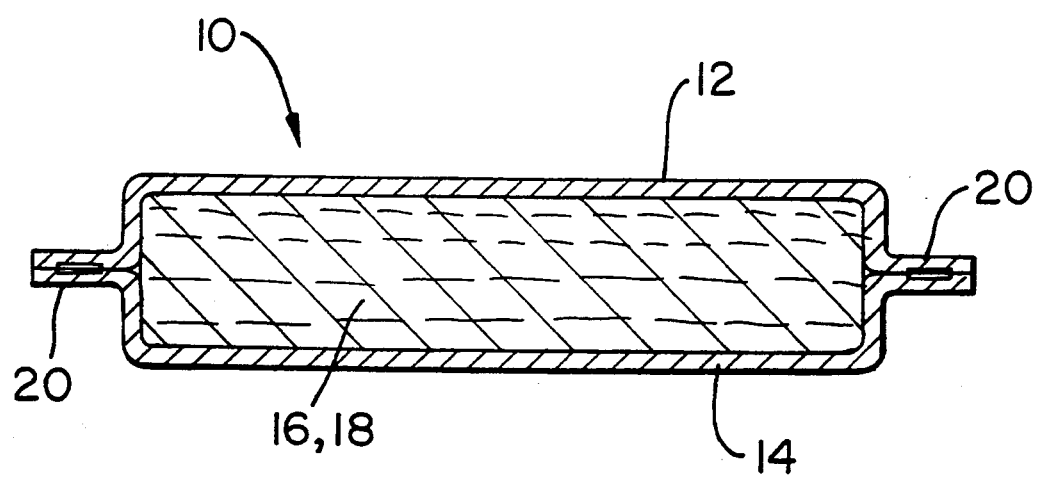
FIG. 2 is a sectional view thereof taken along the line 2—2 of FIG. 1.

Referring now to the drawing, and in particular to FIG. 1 thereof, therein illustrated is a susceptor according to the present invention, generally designated by the reference numeral 10. The susceptor 10 comprises a first microwave-transparent plastic film 12, a second microwave-transparent plastic film 14, and a semi-liquid lossy material 16 disposed intermediate the first and second films 12, 14. The lossy material 16 includes glycerine, sucrose ester, and chloride salt and is characterized by the property that 25 grams thereof in a 50 milliliter glass beaker is heatable to at least 200° C. within 40 seconds by 900 watts of microwave energy in a 1.1 cubic foot oven. The lossy material may be present intermediate the films 12, 14 by itself, or it may be absorbed on a paper layer 18 sandwiched between the first and second films 12, 14. The peripheral edges 20 of the films 12, 14 are secured together in a conventional manner (for example, by heat sealing, sonic sealing, or the like) in order to provide a liquid-tight package about the lossy material 16.

The susceptor 10 may be in any convenient configuration suitable for household use, and this configuration may in turn depend upon the particular food to be cooked. For example, it may be flat and serve as the top or lid of a frozen food package (e.g., the type sold in supermarkets in a one- or two-serving size) or as a cooking tray. Alternatively it may be box-like or cylindrical to substantially enclose the food to be cooked. Clearly, the configuration may be anywhere between these two extremes—for example, a hemisphere which surrounds half of a spherical item of food.

Typically the films 12, 14 are each about 0.01–0.10 millimeters thick, preferably 0.02–0.05 mm., while the thickness of the lossy material 16 therebetween is 0.1–5.0 mm., preferably 0.5–2.0 mm. Where present, the paper layer 18 preferably has a thickness of about 0.2–2.0 mm. Clearly, thicker or thinner films, materials and layers may also be used, if desired. Where a certain rigidity of shape is desired in the susceptor, any paper layer 18 therein may utilize thin paperboard or the entire susceptor may be disposed on a thin paperboard substrate (typically 0.1–2.0 mm. thick, and preferably 0.5–1.5 mm thick). Typically the lossy material 16 covers 50%–100%, and preferably 60%–90%, of each facing surface area of the films 12, 14.

A wide range of materials may be used for the microwave-transparent films 12, 14, although the preferred films are formed of a material which is both edible and biodegradable. Preferred edible and biodegradable materials include carboxymethylcellulose, methylcellulose, carrageenan, and conjac. A preferred film material where high temperature resistance (400°–500° F.) is required is polyethylene terephthalate, although it is neither edible nor biodegradble. Optimally, the films 12, 14 are impermeable to the lossy material 16, while at the same time being permeable to air, so that the sensible temperature rise in the susceptor during microwave cooking does not cause any trapped air within the susceptor to burst the films 12, 14. However, it will be appreciated that, in the event that this does occur, the edible nature of the susceptor ensures that the food being cooked therewith does not become toxic.

As earlier noted, the lossy material 16 includes glycerine, sucrose ester and chloride salt. Preferably the sucrose ester is selected from the group consisting of behenate, stearate, oleate, palmitate, myristate, and laurate esters and combinations thereof, although other sucrose esters may also be used. Preferably the lossy material includes 2%–10% of the sucrose ester based on the weight of the lossy material. It has been found that the presence of the sucrose ester increases the heating rate of the glycerine substantially.

The chloride salt is preferably selected from the group consisting of sodium chloride, potassium chloride, and combinations thereof. The potassium chloride is not as palatable as the sodium chloride, but, since it is unlikely that the potassium chloride will contaminate the food, its presence is acceptable. Preferably the lossy material includes less than 4% chloride salt, based on the weight of the lossy material, although greater levels may be used if desired.

Heating rates were determined by heating 25 grams of the lossy material in a 50 ml. glass beaker heated using a 900 watt, 1.1 cubic foot-household microwave oven—namely, the "Quasar" MQS 1103 oven available from Panasonic. The temperature uniformity of the 25 gram sample domain was found in the range of a 2° C. variance measured by optic fiber probes at three different locations inside the beaker. The heating rate was calculated as the linear temperature rise in the first 30 seconds of heating (i.e., the difference between the initial temperature and the temperature at the end of the 30 seconds, divided by 30). The increases in heating rate are reported as percentage increases over the 3.95° C./sec heating rate of glycerine by itself. Percentage additive levels are based on the weight of the lossy material.

The presence of sucrose ester at the 2%, 4%, 6%, 8% and 10% levels in the glycerine increases the heating rate of glycerine by 5.8, 10.6, 21.5, 16.5 (out of line due to high viscosity effects as tested in a 50 ml beaker), and 38.2%. The presence of sodium chloride at the 2% level in the glycerine increases the heating rate of glycerine by 16.5%, while higher NaCl levels (up to 10%) did not show any further improvement in the heating rate and indeed some levels showed a decrease in the heating rate from the 2% level. Combinations of the sucrose ester and the chloride salt were particularly effective in increasing the heating rate of glycerine alone. Thus, as a lossy material containing glycerine and 2% sodium chloride salt had the sucrose ester level raised from 2% to 4% to 6%, the heating rate increased from 15.4% to 45.5% to 54.4%, respectively. Accordingly, the combination of these ingredients is especially preferred for its high effectiveness, low cost, and recognized safety as food-grade (edible) materials.

The improvements in heating rate noted above through the use of the sucrose ester and chloride salt additives are specific to the use of glycerine as the solvent or carrier for the additives. No significant improvement in the microwave heating rate was noted where the solvent or carrier was propylene glycol and, indeed, some of the additive levels even resulted in a negative effect on the heating rate thereof.

In addition to the sucrose ester and chloride salt, the lossy material preferably also includes a lossiness enhancer selected from the group consisting of sodium carboxymethylcellulose (CMC), an acidic polysaccharide gum, and propylene glycol.

While CMC as an additive to glycerine shows a substantial increase in the heating rate (2%, 4%, 6% and 8% CMC levels producing increases of 18.2%, 19.19%, 26.3% and 31.1%, respectively), the 8% level caused the lossy material to form a gel, with a resultant uneven heating being produced as tested in a 50 ml beaker. On the other hand, where the lossy material consisted of glycerine and 4% sucrose ester, a 1% CMC level resulted in a 35.2% increase over the heating rate of glycerine above, substantially more than the 10.6% increase which would be produced by the addition of 4% sucrose ester to glycerine. Surprisingly, increasing the CMC level to 2% (in the glycerine and 4% sucrose ester lossy material) resulted in a decrease of the heating rate from that obtained at the 1% CMC level. Accordingly, it is preferred that CMC be used in connection with glycerine and sucrose ester at less than a 2% level, based on the weight of the lossy material.

The acidic polysaccharide gum is preferably edible and biodegradable and is preferably selected from the group consisting of Karaya gum, Ghatti gum, Tragacanth gum, and combinations thereof. At the 4% level the Karaya, Ghatti and Tragacanth gums resulted in increases of 38.1%, 43.3% and 36.7%, respectively, while at the 8% level the same gums resulted in increased heating rates of 47.3%, 49.3% and 54.1%, respectively. While the aforenoted gums at the 4% and 8% levels produced substantial increases in the heating rate of glycerine alone, the gums also tend to result in gelling of the lossy material, and thus uneven heating by the susceptor, and therefore must be used with caution.

While the addition of propylene glycol to glycerine at the 4% and 6% levels resulted in heating rate increases of 6.3% and 23.1%, respectively, a further increase to the 8% level resulted in a decrease in the heating rate increase to 16.3%. Where the lossy material included sucrose ester, mixed results on the heating rate were obtained by the addition of propylene glycol. Generally, higher levels of propylene glycol in combination with higher levels of sucrose ester showed less improvement than lower levels of propylene glycol in combination with lower levels of sucrose ester.

While the affects on heating rate of the lossiness enhancers are not always positive (depending upon the materials used and the levels at which they are used), the results do appear to show that synergistic effects may be obtained with appropriate materials at appropriate levels. Accordingly, a preferred composition for the lossy material is within the ranges shown in Table I below.

TABLE I

| Ingredients | % (w/w) |
| --- | --- |
| Glycerine | 60–95 |
| Sucrose Ester | 2–10 |
| Chloride Salt (NaCl) | 1–4 |
| Propylene Glycol | 2–6 |
| Na-CMC | 0.5–6 |
| *Optional | |
| Gum Karaya | 2–5 |
| Gum Ghatti | 2–8 |
| Gum Tragacanth | 1–5 |

As earlier noted, the lossy material is semi-liquid in form—that is, it has a viscosity intermediate that of a conventional liquid and a conventional gel. Where the viscosity is too high, the lossy material does not become evenly distributed throughout the susceptor and can therefore result in uneven heating—that is, hot spots and cold spots on the susceptor. On the other hand, where the viscosity is too low, the lossy material is hard to contain within the susceptor and may leak out during microwave heating. Assuming that the leakage does not occur until after the lossy material has performed its function in the susceptor, this does not affect the cooking process in progress at that time. However, the susceptor of the present invention is intended to be re-usable, and leakage of the lossy material from the susceptor is undesirable since it precludes re-usability of the susceptor.

In order to provide a desirable viscosity for application of the lossy material, the lossy material may additionally include a viscosity modifier. While any of the known viscosity modifiers which do not adversely affect the lossy material with regard to its lossy properties may be used, preferably the viscosity modifier is both edible and biodegradable. Preferred viscosity modifiers include gelatin, pectin, Na-CMC, and combinations thereof.

To use the susceptor of the present invention, an assembly is provided with the susceptor and the food to be microwave cooked in intimate contact. The assembly is then placed in a microwave oven and cooked with the food in intimate contact with the susceptor. Finally, the assembly is removed from the oven, and the microwave cooked food is separated from the susceptor. As earlier noted, assuming there has been no leakage, the susceptor may be reused.

It will be appreciated by those skilled in the food arts that the susceptor of the present invention is capable of safely and quickly raising the outer surface of a foodstuff to a temperature in excess of that required for the Maillard reaction (about 135° C.) in a relatively short time (about 40–120 sec.) so that a true browning reaction is obtainable during the microwave cooking.

To summarize, the present invention provides a susceptor for use in the microwave cooking of food, which susceptor contains a lossy material heatable to at least 200° C. in a common household microwave oven. In the preferred embodiment, the susceptor is both edible and biodegradable. The susceptor is economical to manufacture and simple and safe to use. The present invention also provides a method of microwave cooking using such a susceptor.

Now that the preferred embodiments of the present invention have been shown and described in detail, various modifications and improvements thereon will become readily apparent to those skilled in the art. Accordingly, the spirit and scope of the present invention is to be construed broadly and limited only by the appended claims, and not by the foregoing specification.

We claim:

1. A susceptor for use in the microwave cooking of food, comprising:
   (A) a first plastic film;
   (B) a second plastic film; and
   (C) disposed intermediate said first and second films, a semi-liquid lossy material including glycerine, sucrose ester, and chloride salt, 25 grams of said lossy material in a 50 ml. glass beaker being heatable to at least 200° C. within 40 seconds by 900 watts of microwave energy in a 1.1 cu. ft. oven; said lossy material including glycerine, 2–10% sucrose ester selected from the group consisting of behenate, stearate, oleate, palmitate, myristate, and laurate esters and combinations thereof, and less than 4% chloride salt selected from the group consisting of sodium chloride, potassium chloride, and combinations thereof, based on the weight of said lossy material.

2. The susceptor of claim 1 additionally including a layer of paper sandwiched between said first and second films, said lossy material being absorbed on said paper layer.

3. The susceptor of claim 2 wherein said susceptor is edible and biodegradable.

4. The susceptor of claim 1 wherein said chloride salt is selected from the group consisting of sodium chloride, potassium chloride, and combinations thereof.

5. The susceptor of claim 1 wherein said sucrose ester is selected from the group consisting of behenate, stearate, oleate, palmitate, myristate, and laurate esters and combinations thereof.

6. The susceptor of claim 1 wherein said lossy material also includes a lossiness enhancer selected from the group consisting of sodium carboxymethylcellulose, an acidic polysaccharide, and propylene glycol.

7. The susceptor of claim 6 wherein said lossiness enhancer is selected from the group consisting of less than 4% sodium carboxymethylcellulose, less than 8% acidic polysaccharide gum, and less than 6% propylene glycol, based on the weight of said lossy material.

8. The susceptor of claim 1 wherein said lossy material includes sodium carboxymethylcellulose.

9. The susceptor of claim 8 wherein said lossy material includes less than 4% sodium carboxymethylcellulose, based on the weight of said lossy material.

10. The susceptor of claim 1 wherein said lossy material includes an acidic polysaccharide gum selected from the group consisting of Karaya gum, Ghatti gum, Tragacanth gum, and combinations thereof.

11. The susceptor of claim 10 wherein said lossy material includes less than 8% acidic polysaccharide gum, based on the weight of said lossy material.

12. The susceptor of claim 1 wherein said lossy material includes propylene glycol.

13. The susceptor of claim 12 wherein said lossy material includes less than 6% propylene glycol, based on the weight of said lossy material.

14. The susceptor of claim 1 wherein said lossy material additionally includes a viscosity modifier selected from the group consisting of gelatin, pectin, sodium carboxymethylcellulose, and combinations thereof, thereby to provide a desirable viscosity for application of said lossy material.

15. The susceptor of claim 1 wherein said susceptor is edible.

16. The susceptor of claim 1 wherein said susceptor is biodegradable.

17. A susceptor for use in the microwave cooking of food, comprising:
   (A) a first plastic film;
   (B) a second plastic film;
   (C) a layer of paper sandwiched between said first and second films; and
   (D) disposed intermediate said first and second films and absorbed on said paper layer, a semi-liquid lossy material including glycerine, sucrose ester, and chloride salt, 25 grams of said lossy material in a 50 ml. glass beaker being heatable to at least 200° C. within 40 seconds by 900 watts of microwave energy in a 1.1 cu. ft. oven; said lossy material including glycerine, 2–10% sucrose ester selected from the group consisting of behenate, stearate, oleate, palmitate, myristate, and laurate esters and combinations thereof, and less than 4% chloride salt selected from the group consisting of sodium chloride, potassium chloride, and combinations thereof, based on the weight of said lossy material; said susceptor being biodegradable and edible.

18. The susceptor of claim 17 wherein said lossy material also includes a lossiness enhancer selected from the group consisting of less than 4% sodium carboxymethylcellulose, less than 8% of acidic polysaccharide gum selected from the group consisting of Karaya gum, Ghatti gum, Tragacanth gum, and combinations thereof and less than 6% propylene glycol, based on the weight of said lossy material, and a viscosity modifier selected from the group consisting of gelatin, pectin, sodium carboxymethylcellulose, and combinations thereof, thereby to provide a desirable viscosity for application of said lossy material.

19. A method of microwave cooking comprising the steps of:
   (A) providing an assembly of a susceptor and the food to be microwave cooked, the susceptor comprising a first plastic film, a second plastic film, and, disposed intermediate the first and second films, a semi-liquid lossy material; said lossy material including glycerine, 2–10% sucrose ester selected from the group consisting of behenate, stearate, oleate, palmitate, myristate, and laurate esters and combinations thereof, and less than 4% chloride salt selected from the group consisting of sodium chloride, potassium chloride, and combinations thereof, based on the weight of said lossy material;
   (B) cooking the food in intimate contact with the susceptor in a microwave oven; and
   (C) separating the microwave cooked food from the susceptor.

20. The method of claim 19 wherein the susceptor is edible and biodegradable.

21. A susceptor for use in the microwave cooking of food, comprising:
   (A) a first plastic film;
   (B) a second plastic film; and
   (C) disposed intermediate said first and second films, a semi-liquid lossy material including glycerine, sucrose ester, and chloride salt, 25 grams of said lossy material in a 50 ml. glass beaker being heatable to at least 200° C. within 40 seconds by 900 watts of microwave energy a 1.1 cu. ft. oven; said lossy material also including a lossiness enhancer selected from the group consisting of less than 4% sodium carboxymethylcellulose, less than 8% acidic polysaccharide gum, and less than 6% propylene glycol, based on the weight of said lossy material.

22. The susceptor of claim 21 additionally including a layer of paper sandwiched between said first and second films, said lossy material being absorbed on said paper layer.

23. The susceptor of claim 22 wherein said susceptor is edible and biodegradable.

24. The susceptor of claim 21 wherein said chloride salt is selected from the group consisting of sodium chloride, potassium chloride, and combinations thereof.

25. The susceptor of claim 21 wherein said sucrose ester is selected from the group consisting of behenate, stearate, oleate, palmirate, myristate, and laurate esters and combinations thereof.

26. The susceptor of claim 21 wherein said lossy material includes 2–10% sucrose ester and less than 4% chloride salt, based on the weight of said lossy material.

27. The susceptor of claim 21 wherein said lossy material includes glycerine, 2–10% sucrose ester selected from the group consisting of behenate, stearate, oleate, palmirate, myristate, and laurate esters and combinations thereof, and less than 4% chloride salt selected from the group consisting of sodium chloride, potassium chloride, and combinations thereof, based on the weight of said lossy material.

28. The susceptor of claim 21 wherein said lossy material includes sodium carboxymethylcellulose.

29. The susceptor of claim 28 wherein said lossy material includes less than 4% sodium carboxymethylcellulose, based on the weight of said lossy material.

30. The susceptor of claim 21 wherein said lossy material includes an acidic polysaccharide gum selected from the group consisting of Karaya gum, Ghatti gum, Tragacanth gum, and combinations thereof.

31. The susceptor of claim 30 wherein said lossy material includes less than 8% acidic polysaccharide gum, based on the weight of said lossy material.

32. The susceptor of claim 21 wherein said lossy material includes propylene glycol.

33. The susceptor of claim 32 wherein said lossy material includes less than 6% propylene glycol, based on the weight of said lossy material.

34. The susceptor of claim 21 wherein said lossy material additionally includes a viscosity modifier selected from the group consisting of gelatin, pectin, sodium carboxymethylcellulose, and combinations thereof, thereby to provide a desirable viscosity for application of said lossy material.

35. The susceptor of claim 21 wherein said susceptor is edible.

36. The susceptor of claim 21 wherein said susceptor is biodegradable.

37. A susceptor for use in the microwave cooking of food, comprising:
(A) a first plastic film;
(B) a second plastic film;
(C) a layer of paper sandwiched between said first and second films; and
(D) disposed intermediate said first and second films and absorbed on said paper layer, a semi-liquid lossy material including glycerine, sucrose ester, and chloride salt, 25 grams of said lossy material in a 50 ml. glass beaker being heatable to at least 200° C. within 40 seconds by 900 watts of microwave energy in 1.1 cu. ft. oven; said lossy material also including a lossiness enhancer selected from the group consisting of less than 4% sodium carboxymethylcellulose, less than 8% of acidic polysaccharide gum selected from the group consisting of Karaya gum, Ghatti gum, Tragacanth gum, and combinations thereof and less than 6% propylene glycol, based on the weight of said lossy material; said susceptor being biodegradable and edible.

38. The susceptor of claim 37 wherein said lossy material includes glycerine, 2–10% sucrose ester selected from the group consisting of behenate, stearate, oleate, palmitate, myristate, and laurate esters and combinations thereof, and less than 4% chloride salt selected from the group consisting of sodium chloride, potassium chloride, and combinations thereof, based on the weight of said lossy material.

39. A method of microwave cooking comprising the steps of:
(A) providing an assembly of a susceptor and the food to be microwave cooked, the susceptor comprising a first plastic film, a second plastic film, and, disposed intermediate the first and second films, a semi-liquid lossy material including glycerine, sucrose ester, and chloride salt; said lossy material also including a lossiness enhancer selected from the group consisting of less than 4% sodium carboxymethylcellulose, less than 8% of acidic polysaccharide gum selected from the group consisting of Karaya gum, Ghatti gum, Tragacanth gum, and combinations thereof and less than 6% propylene glycol, based on the weight of said lossy material;
(B) cooking the food in intimate contact with the susceptor in a microwave oven; and
(C) separating the microwave cooked food from the susceptor.

40. The method of claim 39 wherein the susceptor is edible and biodegradable.

* * * * *